United States Patent [19]
Gruber et al.

[11] 3,897,210
[45] July 29, 1975

[54] METHOD AND APPARATUS FOR STERILIZING PARTICULATE MATERIAL

[75] Inventors: Daniel L. Gruber; Earl D. Pollock, both of Milwaukee, Wis.

[73] Assignee: Bacfree Industries, Inc., Milwaukee, Wis.

[22] Filed: Jan. 2, 1973

[21] Appl. No.: 320,241

Related U.S. Application Data

[63] Continuation-in-part of Ser. No. 141,139, May 7, 1971, abandoned.

[52] U.S. Cl. .................. 21/58; 21/93; 21/DIG. 4; 99/474; 426/318; 426/320
[51] Int. Cl. .......... A61l 1/00; A23l 3/18; A23l 3/34
[58] Field of Search .................. 21/58, DIG. 4, 93; 426/236, 312, 318–320; 99/473, 474, 476; 259/DIG. 17, DIG. 18; 55/279

[56] References Cited
UNITED STATES PATENTS

| | | | |
|---|---|---|---|
| 2,131,134 | 9/1938 | Baer et al. | 21/DIG. 4 |
| 2,276,805 | 3/1942 | Tolman | 55/288 |
| 2,792,074 | 5/1957 | Schilb et al. | 55/341 |
| 3,088,179 | 5/1963 | Leuthner | 21/91 |
| 3,097,916 | 7/1963 | Dawson et al. | 99/235 S |
| 3,341,280 | 9/1967 | Eolkin | 21/58 |
| 3,600,127 | 8/1971 | Kereluk et al. | 21/58 |
| 3,627,469 | 12/1971 | Cheng | 21/DIG. 4 |
| 3,767,362 | 10/1973 | Griffin et al. | 21/58 |

Primary Examiner—Barry S. Richman
Assistant Examiner—Bradley Garris
Attorney, Agent, or Firm—Wheeler, Morsell, House & Fuller

[57] ABSTRACT

Method and pneumatic apparatus for sterilizing a particulate material such as ground food particles. The apparatus includes a sterilizing chamber with one or more porous collecting bags or the like into which the particulate material is blown in a turbulent gas stream. Sterilizing gas is blown through the particulate material for a sterilizing period. The sterilized particulate material is then flushed with sterilized gas free air and discharged from the collecting bags into a storage receptacle.

9 Claims, 8 Drawing Figures

PATENTED JUL 29 1975

3,897,210

SHEET 1

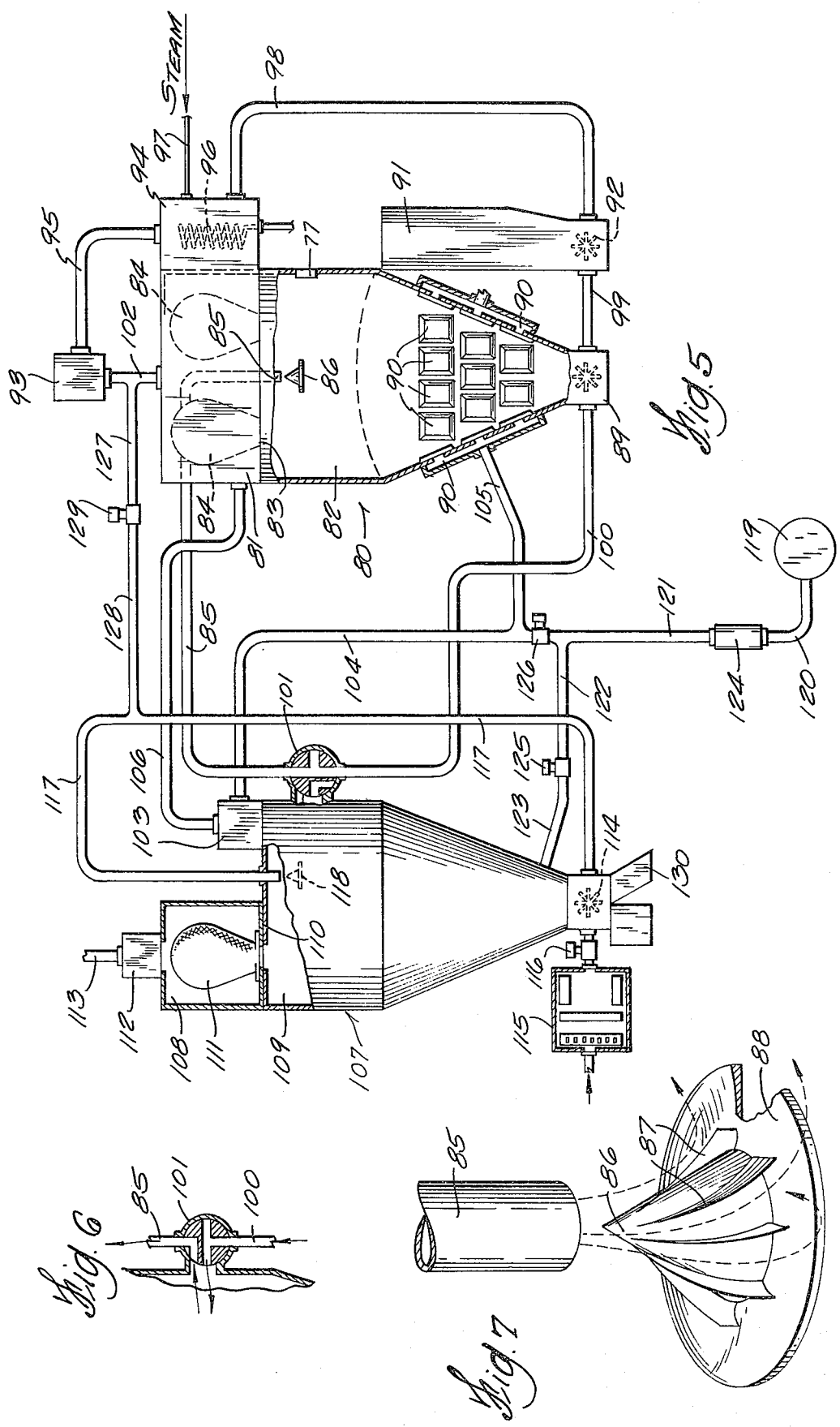

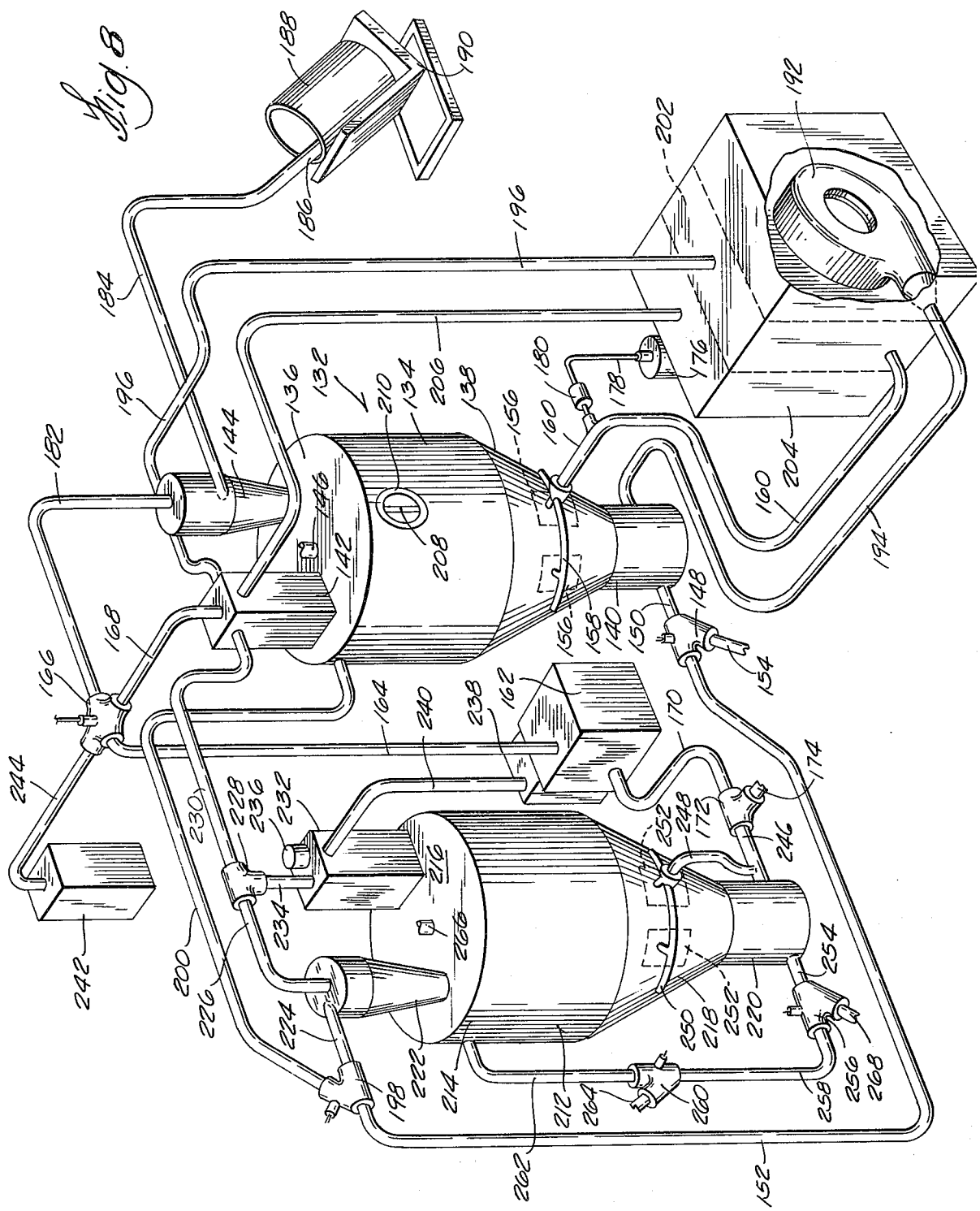

METHOD AND APPARATUS FOR STERILIZING PARTICULATE MATERIAL

CROSS REFERENCE TO RELATED APPLICATION

This application is a continuation-in-part of copending U.S. application Ser. No. 141,139, now abandoned, which was filed on May 7, 1971 for a "Method and Apparatus for Sterilizing Particulate Material".

BACKGROUND OF THE INVENTION

U.S. Pat. Nos. 3,088,179 and 3,341,280 show several prior art proposals for sterilizing particulate material such as dry powdered foods. The particulate material is exposed to a sterilizing gas such as ethylene oxide. While these patents propose techniques which purport to increase and improve results, the technique in common use today is simply to place an open top container of particulate material such as spices in a closed room, charging this room with an atmosphere containing a sterilizing gas such as ethylene oxide and maintaining this condition for a period of about 24 hours during which the sterilizing gas is expected to penetrate the particulate material and sterilize it.

SUMMARY OF THE INVENTION

The present invention improves on the prior art by a simplified method and apparatus in which the particulate material is blown in a gas stream into a separator which may include one or more porous bags which trap the particulate material. A sterilizing gas is injected into the gas stream and a blower blows the sterilizing gas through the particulate material for a period of time necessary to sterilize the particulate material. Turbulence may be induced in the gas en route to the trapped particulate material.

In preferred embodiments the gas stream is recirculated back to the blower for repeated treatment of the particulate material. After sterilization has been completed the sterilizing gas is bled off and is replaced by filtered and sterilized gas free air which will flush the particulate material to remove all traces of the sterilizing gas therefrom. In one embodiment, this is done in the sterilizing chamber. In another embodiment, it is done in a separate aerating chamber. Thereafter the collecting bags are shaken to dump the trapped particulate material into a hopper from which the material is discharged to a storage receptacle.

An object of the invention is to shorten the time of exposure of the particulate material to the sterilizing gas and to increase its effectiveness by washing or flushing turbulent sterilizing gas over the particulate material which is concurrently wholly or partially suspended in a fluidized state. Treatment takes place in a cycle which reduces to the minimum the time required for the sterilization process. In accordance with the present invention, a batch of particulate material (a typical quantity being in the range of 200 to 3000 pounds) can be treated in a time span of 3-6 hours. This is in sharp contrast to the conventional present day treatment technique in which the particulate material must be exposed to the gas for a period of twenty-four hours.

Other objects, features, and advantages of the invention will appear from the following disclosure.

DESCRIPTION OF THE DRAWINGS

FIG. 5 is a diagrammatic view of a second embodiment of the invention.

FIG. 6 is a detail view of the diverter valve of FIG. 5, shown in a second position.

FIG. 7 is a perspective view of a dispersal cone for dispersing the particulate matter in the sterilizing gas stream.

FIG. 8 is a diagrammatic perspective view of a third embodiment of the invention.

DESCRIPTION OF THE PREFERRED EMBODIMENTS

Figure 1:
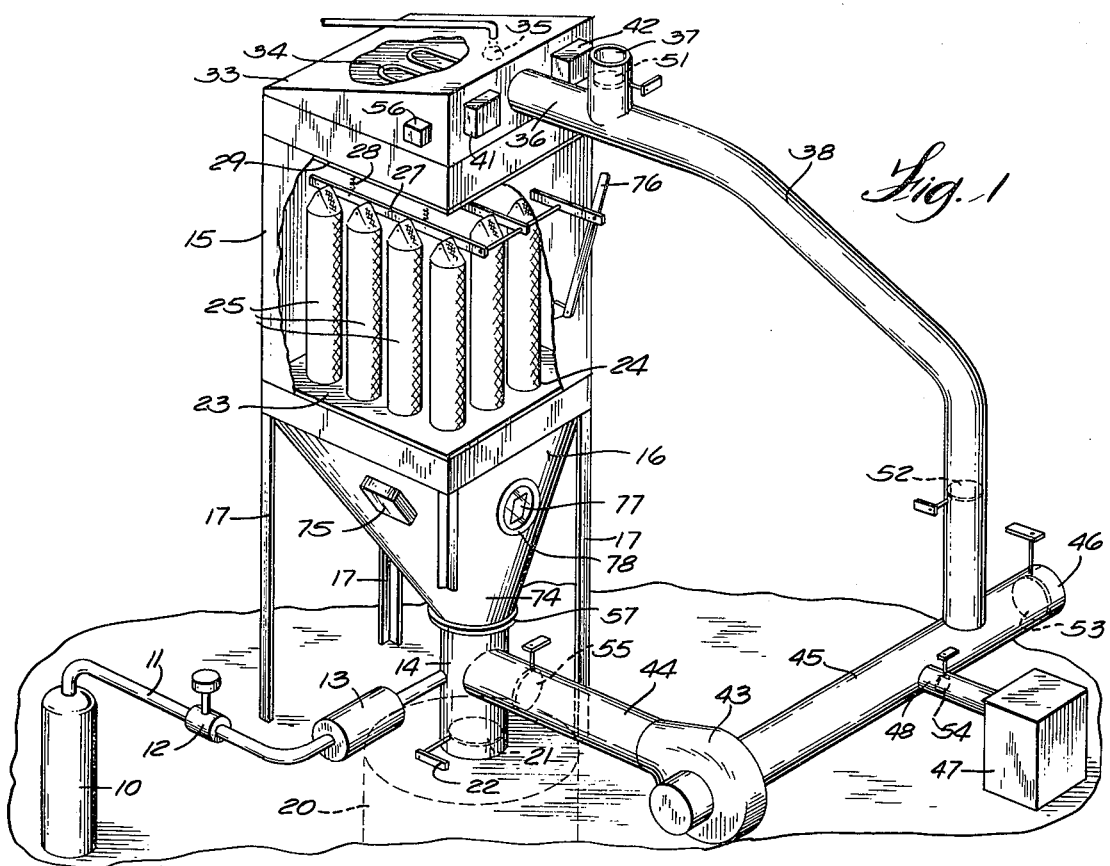
FIG. 1 is a diagrammatic perspective view of apparatus embodying the invention, wall portions being broken away to expose interior details.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The apparatus and method of the present invention is adapted for use with any type of particulate material which can be fluidized with a gas. The present invention will find great utility in the sterilization of dry powdered food and particularly condiments such as spices, herbs, aromatic seeds, nutmeats, seasoning salts, etc. Powdered cosmetics and pharmaceuticals and powdered ingredients thereof are also aptly subject to sterilization according to the present invention.

The sterilizing gas useful in the present invention can consist of any of the operable sterilizing gases and vapors which are suitable for eliminating or reducing the micro-organisms present in the material to be sterilized. Typical examples of such gases include ethylene oxide, propylene oxide, formaldehyde, methyl bromide, beta propiolactone, alkyl pryrocarbonates, ammonia, epichlorohydrin, epibromohydrin, ethylene imine, ethylene sulfide, glycidaldehyde, propylene imine, chloropicrin, ozone, and the like. These materials may be used alone or in various combinations with other sterilizing gases or in combination with inert carrier gases such a dichlorodifluoromethane (Freon), nitrogen oxygen, carbon dioxide, or air.

FIGS. 1 through 4 disclose one illustrative embodiment of the invention. Referring to FIGS. 1–4, the sterilizing gas is typically provided in a tank or cannister 10 which is conveyed through a pipe line 11, a control valve 12, and a heat exchanger 13 into the vertically arranged spout 14 of a sterilizing chamber which includes a hopper-shaped plenum chamber 16 connected to the top of spout 14 and a collector chamber 15 above the hopper 16.

Heat exchanger 13 is desirably operated as a heater to increase the temperature of the gas so that it enters the system at a temperature lethal to the micro-organisms present on the treated material.

Chamber 15 is supported on legs 17 above a storage receptacle 20 into which the sterilized product is periodically discharged under control of valve 21 at the bottom of spout 14. Valve 21 is actuated by handle 22 which can be either manually or power operated.

Figure 4:
FIG. 4 is an enlarged detail view showing the mode of suspending a collector bag in the sterilizing chamber.
Figure 3:
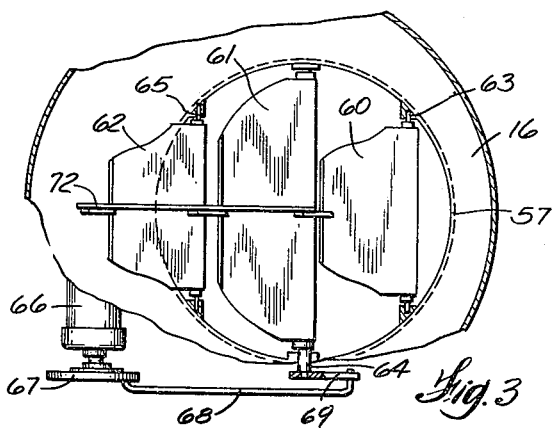
FIG. 3 is a cross section taken along the line 3—3 of FIG. 2.

The sterilizing chamber 15 has a partition 23 spaced somewhat above the upper end of the plenum 16. Partition 23 is provided with a series of ports 24 to which the bottom open ends of porous bags 25 are sealed by rubber grommets 26, as shown in FIG. 4. In a practical embodiment of the invention the bags 25 are about four inches in diameter and about five feet long. Twenty-four of the bags are disposed in the chamber 15. The upper ends of the bags 25 are suspended on hangers 26 from a series of cross rods or straps 27 which are in turn individually suspended on short springs 28 from a fixed grid 29 spanning across the top of the sterilizing chamber 15. The upper ends of the bags 25 are held in shape by the coil spring rings 32.

Above the level of the grid 29 the chamber 15 has a top plenum chamber 33 which contains a heat exchanger such as a heating coil 34 and a water jet 35. Plenum 33 is desirably gradually enlarged in cross section toward outlet duct 36 which has a short vent duct branch 37 and a bypass or return duct branch 38.

In one side wall of the upper plenum 33 is mounted a thermostat 41 by which the temperature of the gas flowing through the sterilizing chamber is controlled by periodically energizing and de-energizing the heating coil 34. A desirable temperature range is 110°–160° F. Humidity of the gases flowing through the sterilizing chamber is controlled by humidistat 42 which controls injection of water spray through the jet 35 into plenum 33. A desirable humidity range is 5–10% relative humidity. In the case of spices this humidity range inhibits evaporation of essential oils from the spices and also conditions the bacteria for effective action by the gas.

Gas is blown from blower 43 into the bottom of lower plenum 16 through an injection duct 44. The eye of blower 43 is connected to a supply duct 45 having an inlet port 46 at its end through which the dry particulate material is introduced into the system. Adjacent duct 45 is a filter and sterilizing unit 47 by which atmospheric air can be drawn into the system after sterilization by exposure to germicidal lamps or the like and filtering. The sterilized air travels from the unit 47 to the duct 45 through the intermediate duct 48.

There are control dampers or valves in the various ducts. Vent 37 is provided with a control damper 51. Bypass duct 38 is provided with a control damper 52. Entrance port 46 of the blower supply duct 45 is provided with a control damper 53. Intermediate duct 48 is provided with a control damper 54. Inlet duct 44 is provided with a control damper 55. All dampers or valves 21, 51, 52, 53, 54, 55 may be actuated manually or through power operators subject to remote or automatic control.

The control valve 12 in the sterilized gas supply line 11 is desirably operated during the sterilizing cycle in resonse to a pressure sensitive switch 56 which is also in the upper plenum 33 of the sterilizing chamber 15.

The entry mouth 57 to the lower plenum chamber 16 is desirably provided with apparatus 58 to create turbulence in the upward flow of gas through the plenum 16. This apparatus 58 desirably comprises a series of vanes 60, 61, 62 respectively mounted on oscillating shafts 63, 64, 65. Shaft 64 is oscillated by motor 66, the output shaft of which is connected to a crank disk 67 which in turn is connected to a pitman 68 connected to the crank 69 on the end of shaft 64.

Oscillating motion from the central shaft 64 is communicated to the vanes 60, 62 through a connecting link 72 which is pivotally attached to the upper edges of the vanes on pins 71.

Figure 2:
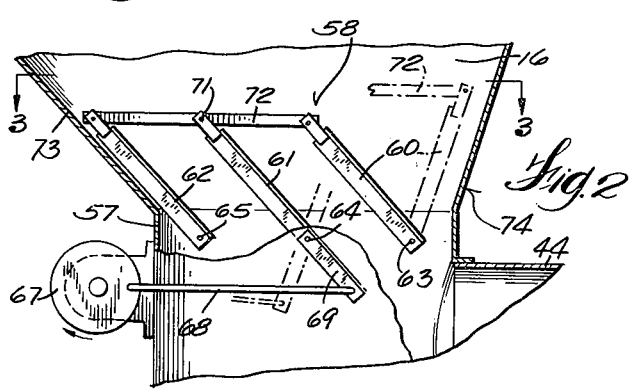
FIG. 2 is a fragmentary vertical cross section taken through the turbulence plenum or hopper of the apparatus shown in FIG. 1.

As best shown in FIG. 2, a practical embodiment of the invention incorporates a plenum hopper 16 which has curved side walls which flare upwardly from a circular cross section at mouth 57 to a rectangular cross section where they connect to the bottom of the rectangular sterilizing chamber 15. At one side 73 the plenum wall is at about a 45 degree angle to the horizontal, whereas at its opposite side 74 the plenum wall is at about a 75 degree angle to the horizontal. The drive mechanism for the vanes 60, 61, 62 is accordingly designed to oscillate the vanes to about a 45 degree angle at one side of their sweep and to about a 75 degree angle at the other side of their sweep, thus to substantially match the inclination of the vanes to the slope of the walls 73, 74 of the plenum hopper 16. In this manner the oscillating vane apparatus 58 will create turbulence in the gas blown upwardly through the plenum chamber 16 and will periodically sweep or flush the gas stream against the walls 73, 74 to dislodge and fluidize any particulate material which tends to settle or collect on these walls.

The side wall of plenum hopper 16 is also provided with a mechanical vibrator 75 which can be periodically or continuously actuated to assist in dislodging collected particulate material off of the wall.

At the side of the chamber 15 there is a lever 76 which is connected to the rods or straps 27 which support the bags 25 on the hangers 26. Manual agitation of the lever 76 will cause the straps 27 to swing on their spring suspenders 28, thus to shake the bags 25 and dislodge and discharge particulate material therefrom.

In operation, the particulate material is introduced into the system through the port 46. This port may be provided with a suction hose which will suck the particulate material out of a container under the influence of blower 43. While loading the system with particulate material, the dampers 51, 53 and 55 are open and dampers 52, 54 and 21 are closed.

The particulate material sucked in through the duct 45 is blown in a stream of gas such as air into the plenum 16 and into the separator bags 25 through the lower plenum chamber 16. The pressure of the gas will distend the bags and support the particulate material in fluid suspension both within the plenum 16 and in the bags 25. The vibrator 75 and the oscillatory vane apparatus 58 will function to maintain a state of fluid turbulence in the plenum chamber 16, in the portions of the sterilizing chamber 15 below partitions 23 and in the bags 25. The bags 25 function as means to separate the particulate material from the gas which continues to flow under pressure of the blower 43.

After the system is fully charged with a batch of particulate material, blower 43 is turned off, damper 53 is closed and gas supply valve 12 is opened to inject sterilizing gas into the spout 14. Valve 12 may be controlled manually or automatically on the basis of a predetermined quantity or weight of gas admitted into the system. The sterilizing gas is typically about one and one-half times heavier than air. Accordingly, as sterilizing gas is injected into spout 14 it will gradually rise through the plenum 16, through the bags 25 and upwardly through chamber 15, thus forcing the lighter air out through the top plenum 33 and through the open vent 37.

When the system is filled with sterilizing gas, as evidenced by the exit of gas through the vent 37, damper 51 is closed, damper 52 is opened and blower 43 is turned on to recirculate turbulent sterilizing gas under pressure of the blower through the particulate material which is trapped in the bags 25 and hopper 16. The particulate material is generally in a state of fluidized suspension and the turbulence and flow of the gas keeps the particles generally in motion, subject to deposit on the inner walls of the bags 25. Vibrator 75 and vane apparatus 58 continue to operate while the sterilizing gas is recirculated through the system. The particulate material trapped in the separator bags 25 and in the hopper 16 is flushed continuously with the sterilizing gas and the turbulent flow of the gas tumbles the particulate material to insure maximum exposure of all portions of the particulate material to the sterilizing gas for effective biological action of the sterilizing gas upon any micro-organisms present in the particulate material.

The gas is recycled as aforesaid for a period of time necessary to insure reduction in the micro-organisms present in the particulate material to an acceptable level. This is typically ascertained by visual observation of a mold spore strip 77 which is disposed within a window 78 in the side wall of the plenum hopper 16. When the mold spore strip indicates that the sterilization procedure has been completed, damper 51 is opened to vent the sterilizing gas to atmosphere or to a closed collection system. Damper 52 is concurrently closed to prevent recirculation of the sterilizing gas and damper 54 is opened to admit into the intake pipe 45 of blower 43 a supply of atmospheric air which has been sterilized and filtered in the unit 47.

The blower 43 continues to operate to discharge from the system all of the sterilizing gas. Vane unit 58 continues to operate and the fresh air from unit 47 is flushed over the particulate material to wash all traces of sterilizing gas from the particulate material and discharge the same through the vent 37. Sterilizing gas discharged through vent 37 can be collected for re-use or can be discharged to the atmosphere.

After monitoring of the discharge through vent 37 discloses complete removal from the product of sterilizing gas, the blower 43 is shut down and discharge valve 21 in spout 14 is opened. The lack of fluid pressure permits the particulate material to fall into hopper 16. Lever 76 is also shaken to dislodge and discharge the contents of the bags 25 down through the hopper 16 and spout 14 into the storage receptacle 20. The product has been completely sterilized within a time span of 3–6 hours and may be stored indefinitely in the receptacles 20 which are now closed to prevent recontamination.

During the sterilization cycle the pressure sensitive switch 56 in the upper plenum 33 will function to periodically open valve 12 and admit additional sterilizing gas from tank 10 in the event the pressure in plenum 33 drops to a predetermined level at which the switch 56 will function.

While bags 25 are illustrated as examples of means for trapping or separating the particulate material from the gas stream, other means can be used. The chamber 15 could have a single large bag or bags could be eliminated entirely in favor of a porous filter screen or the like at the top of chamber 15. However, the use of a plurality of bags 25 increases the filter screen area and is advantageous from the standpoint of reducing the concentration of material build up on the porous separator. In practice, however, most of the particulate material will remain in fluid and turbulent suspension so that the tendency for it to deposit on the bag wall is minimized.

FIGS. 5, 6 and 7 illustrate a second embodiment of the invention which utilizes two separate chambers instead of a single treatment chamber as disclosed above. The particulate matter is sterilized in a treatment chamber and is aerated with fresh air in the other chamber after the sterilization process is completed. This embodiment also has different means for blowing the sterilizing gas through the particulate matter as will be described below.

Referring to FIG. 5, the sterilizing chamber 80 is divided into a plenum chamber 81 and a treatment chamber 82 by means of a partition 83. A plurality of ports are formed in the partition 83 and a plurality of porous collecting bags 84 are attached around the ports and extend into the plenum chamber 81. Porous collecting bags 84 serve to separate the particulate material from the sterilizing gas as in the previously described embodiment. A conduit 85 also extends through partition 83 and terminates above a dispersal cone 86 which is supported in the upper end of treatment chamber 82 by conventional means not shown in the drawings. The dispersal cone 86 has curved vanes 87 (see FIG. 7) and a horizontal apron 88 which serve to deflect, scatter, and disperse particulate material which is blown onto the top of cone 86 via conduit 85. The dispersal cone 86 may be rotated by conventional means not shown in the drawings.

The lower portion of treatment chamber 82 is downwardly sloped on all four sides and terminates in a rotary feed device 89 which removes particulate material from the bottom of treatment chamber 82 and feeds it into a conduit system which will be described later. The rotary feed device 89 introduces particulate material from hopper 80 into a stream of gas flowing in conduit 99 and may be of the type which is described in U.S. Pat. No. 3,053,577 or of any other suitable type. The sloping sides of treatment chamber 82 are fitted on all four sides with a plurality of spaced gas input diffusers 90 through which sterilizing gas can be blown into the sides of treatment chamber 82 to prevent particulate material from sticking to the sides and also to assist in the sterilization of the particulate material. The gas input diffusers 90 incorporate screens to admit gas into chamber 82 and prevent particulate matter from entering conduit 105. They are preferably of the type known as "aerators" in the art and which are used to insure uniform continuous flow of particulate material in bins or hoppers.

An input hopper 91 is attached to the side of sterilization chamber 80 for receiving a charge of particulate material to be sterilized. A rotary feed device 92 is attached to the bottom of hopper 91 for feeding the particulate material into a conduit system which will be described later. The rotary feed device 92 is preferably of the same type as the device 89 described above.

A blower 93 is mounted on top of sterilizing chamber 80 and a heating and humidifying chamber 94 is mounted on the side of sterilizing chamber 80. In the operation of this embodiment, sterilizing gas is blown by blower 93 through conduit 95 into chamber 94 to be heated to a temperature of 130° to 150° Fahrenheit and to have its humidity raised to a relative humidity level of approximately 40%. The heating is effected by an electrical heater coil 96 and the humidification is effected by steam introduced through a steam input line 97. The heating and humidification of the sterilizing gas is not absolutely essential to the operation of this embodiment but it does assist in the sterilization process and materially decreases the time required for complete sterilization.

After being heated and humidified, the sterilizing gas is blown through conduit 98 to rotary feed device 92, where it picks up particulate material from the bottom of input hopper 91. From rotary feed device 92, the mixed gas and particulate material are conducted through conduit 99 to the input of rotary feed device 89, where additional particulate material is picked up from the bottom of treatment chamber 82. The gas and particulate material are then conducted through conduit 100 to diverter valve 101 which in one position (FIG. 5) couples the conduit 100 to conduit 85. The conduit 85 terminates in treatment chamber 82 above dispersal cone 86. The gas and particulate material carried through conduit 85 is scattered by dispersal cone 86 and is tumbled in an upward gas stream which is created in the sterilization chamber 80 by the suction side of blower 93 through the conduit 102. The upward gas stream through sterilization chamber 80 carries the smaller particles of particulate material into the porous collecting bags 84, which trap the particles but allow the gas to pass through, thereby separating the particulate material from the gas.

The lighter particles of particulate material which are trapped by porous collecting bags 84 and which are suspended in the gas stream blowing through the treatment chamber 82 are continuously washed by the sterilizing gas stream. The heavier particles drop down into the bottom of treatment chamber 82 where they are exposed to the gas stream entering chamber 82 through gas input diffusers 90. This gas stream is derived from a second blower 103 which is coupled at its output side to all of the gas input diffusers 90 through conduits 104 and 105 and is coupled at its input side to plenum chamber 81 through conduit 106. After passing by the gas input diffusers 90, the heavier particles drop down into the rotary feed device 89 where they are returned to the top of treatment chamber 82 through conduits 100 and 85.

During the sterilization portion of the operating cycle, the particulate material is continuously recirculated through treatment chamber 82 where the individual particles are repeatedly exposed to and flushed by the sterilizing gas stream developed by blowers 93 and 103. Thus the particulate material is wholly or partially suspended in a fluid state, by means of the blowers, conduits, diffusers, etc. For complete sterilization, this recirculation process is maintained for approximately 3 to 6 hours. After the sterilization process is completed, as determined by observation of a mold spore strip 77, the particulate material is aerated with fresh air to remove all traces of the sterilizing gas. This is done by routing the sterilized particulate material into an aeration chamber 107 through diverter valve 101 by setting the valve to its second position as illustrated in FIG. 6. In this position of diverter valve 101, the sterilizing gas and particulate material carried through conduit 100 is routed into aeration chamber 107 and the excess gas therein is routed or recycled back to sterilization chamber 80 through conduit 85.

Aeration chamber 107 is divided into a plenum chamber 108 and a treatment chamber 109 by a partition 110. The partition 110 has ports therein and porous collecting bags 111 are attached to partition 110 around the ports. There is an opening in the top of plenum chamber 108 and a blower 112 is mounted on top of the opening with its suction side coupled thereto. The other side of blower 112 is coupled to a conduit 113 which exhausts to the atmosphere.

The bottom of treatment chamber 109 has sloping sides and terminates in a rotary feed device 114 which may be the same as rotary feed devices 89 and 92. The air input side of rotary feed device 114 is coupled to an air cooler and sterilizer 115 via a valve 116. The air cooler and sterilizer 115 takes in air from the atmosphere and cools and sterilizes it by any suitable prior art means. When the valve 116 is open, cooled and sterilized air is introduced into rotary feed device 114 where it picks up particulate material and draws the particulate material up through conduit 117 to the top of treatment chamber 109, where it is scattered by a dispersal cone 118 which may be the same as dispersal cone 86. In the aeration cycle, the particulate material is continuously flushed with cooled and sterilized air which is then discharged into the atmosphere to remove all traces of the sterilizing gas. The lighter particles of the particulate material are suspended in the air stream induced in aeration chamber 107 by blower 112 and are separated from the airstream by porous collecting bags 111. The heavier particles drop down into the bottom of treatment chamber 109 where they are picked up by rotary feed device 114 and recirculated back to the top of treatment chamber 109 through conduit 117. The particulate material is thoroughly cleansed of all sterilizing gas in approximately 20 to 30 minutes.

In the preferred mode of operation, the aeration chamber 107 is filled with sterilizing gas prior to receiving a charge of sterilized particulate material so as to prevent diluting the sterilizing gas in sterilizing chamber 80 when the particulate material is introduced through diverter valve 101. This sterilizing gas is derived from a tank of compressed gas 119 which is coupled to the bottom of treatment chamber 109 through conduits 120, 121, 122 and 123. A heat exchanger 124 is coupled between conduits 120 and 121 to heat the gas and a valve 125 is coupled between conduits 122 and 123 to control the flow of gas. When the valve 125 is opened, the sterilizing gas, which is under pressure in tank 119, is admitted to treatment chamber 109. When the valve 125 is closed, the flow of sterilizing gas is blocked.

The conduit 121 is coupled via a valve 126 to conduit 105 for introducing the sterilizing gas into sterilizing chamber 80. When the sterilizing gas is introduced into sterilizing chamber 80, air is exhausted through conduits 127 and 128 and valve 129, which couple conduit 102 to conduit 117 The suction for exhausting the air from sterilizing chamber 80 is derived from blower 112 via conduits 117, 128, 127 and 102. The valves 126 and 129 are opened to fill the sterilizing chamber 80 with sterilizing gas and are closed after the filling operation is completed to contain the gas within sterilizing chamber 80 and the circulatory duct system associated therewith.

In the operation of the above-described embodiment, the sterilizing chamber 80 is first charged with sterilizing gas as described above. The blowers 93 and 103 are then energized to circulate and recirculate the particulate material contained in hopper 91 through sterilizing chamber 80 until the material is completely sterilized. Then before the particulate material is transferred to aeration chamber 107, the chamber is first charged with sterilizing gas so as to avoid diluting the sterilizing gas in sterilizing chamber 80 when the transfer is effected. This is done by closing valve 116, opening valve 125, and energizing blower 112. When aeration chamber 107 is filled with sterilizing gas, valve 125 is closed and diverter valve 101 is moved to the position shown in FIG. 6 to divert sterilized particulate material into aeration chamber 107. After all the sterilized particulate material has been diverted into aeration chamber 107, diverter valve 101 is moved back to the position shown in FIG. 5 and the aeration cycle is begun by opening valve 116 to admit cooled and purified air into aeration chamber 107 to cool and cleanse the sterilized particulate material therein. After the aeration process is completed, blower 112 is de-energized and the particulate material is removed from the bottom of aeration chamber 107 through a discharge chute 130 and is stored in closed containers to avoid contamination.

The valves 116, 125, 126 and 129 are preferably solenoid valves and may be wired for manual operation or for automatic operation under the control of a timer or the like. The rotary feed devices 89, 92, 114 and blowers 93, 103 and 112 may also be wired for manual or automatic operation as desired. Such wiring can be accomplished in accordance with well known prior art techniques and is therefore not illustrated or described herein.

FIG. 8 illustrates a third embodiment of the invention. This embodiment is similar to the embodiment of FIG. 5 in that separate chambers are utilized for sterilizing the particulate material and for aerating the sterilized material, but differs with regard to the means for introducing the particulate material into the chambers and for circulating it through the chambers.

Referring to FIG. 8, a treatment or sterilization chamber 132 has a cylindrical side wall 134, a flat top 136, and a downwardly sloping bottom 138 which terminates in a rotary feed device 140 that may be the same as the rotary feed device 89 described above in connection with FIG. 5. A maintenance slide gate or knife gate which is not shown in the drawings may be mounted above the rotary feed device 140 so that the device can be removed for maintenance purposes while the chamber 132 is filled with particulate matter. Such slide gates or knife gates are well known in the prior art and are frequently mounted above automatic feed devices.

Two collector or filter units 142 and 144 are mounted on the top 136 of chamber 132 and communicate with the interior of chamber 132 through corresponding openings in top 136. Both of the collector or filter units 142 and 144 contain a plurality of porous collecting bags, not shown, which may be the same as the bags 84 shown in FIG. 5, and serve the same purpose, i.e., to separate particulate material from a gas stream in which the particulate material is suspended.

A water conduit 146 also communicates through the top 136 for introducing water into the chamber 132 to clean it. This cleaning water is removed from the system after it passes through chamber 132 by means of a diverter valve 148, which is coupled to the output of rotary feed device 140 through conduit 150, and which can be switched between a particulate material circulating conduit 152 and a water exhaust conduit 154. Diverter valve 148 is preferably a solenoid valve, although it may be manually actuated if desired.

On the side of the sloping bottom portion 138 of chamber 132, a plurality of gas input diffusers or aerators 156 are mounted to introduce sterilizing gas into particulate material which falls onto the sloping side of bottom portion 138. This gas serves to fluidize the particulate material to wholly or partially suspend it within chamber 132 and to prevent it from sticking to the sloping side wall 138 and also helps to sterilize the particulate material. Compressed gas is applied to aerators 156 through a gas manifold 158 which is coupled to a gas input conduit 160 that receives gas under pressure as will be described hereinafter. The aerators 156 incorporate screens which admit gas into chamber 132 and prevent particulate material from entering the gas manifold 158. Aerators of this type are well known in the art and any suitable aerators may be used in this embodiment, including an aerator which has a continuous screen around the interior of bottom portion 138 instead of small spaced units as shown in the drawings.

In the operation of this embodiment, treatment chamber 132 is first filled with a suitable sterilizing gas, then particulate material to be treated is introduced into the chamber and is circulated therethrough in a stream of compressed sterilizing gas. To fill chamber 132 with sterilizing gas, a suction is applied to the top of filter unit 142 from a blower 162 via conduit 164, three way solenoid valve 166, and conduit 168. The compression side of blower 162 is exhausted to the atmosphere through conduit 170, solenoid diverter valve 172, and exhaust conduit 174. As air is drawn out of chamber 132 by the suction of blower 162, a suitable sterilizing gas is admitted into the chamber through aerators 156, gas manifold 158, and conduit 160, from a gas storage cylinder 176, which is coupled to conduit 160 through a solenoid valve 180. The sterilizing gas is heavier than air and displaces the air in chamber 132 upwardly as it enters the chamber through aerators 156. The displaced air is drawn off by the suction of blower 162 until the entire chamber 132 and filter unit 142 is filled with sterilizing gas.

The time at which filter unit 142 becomes filled with sterilizing gas can be determined by a suitable gas detector therein or in blower 162. At this time, solenoid valve 180 is closed to shut off the gas input to chamber 132, and solenoid valve 166 is switched to couple conduit 164 to a conduit 182 that extends from valve 166 to the top of filter unit 144. This removes the suction from the top of filter unit 142 and applies it to the top of filter unit 144 for the purpose of drawing particulate material into the chamber 132 through filter unit 144, which is preferably coupled to chamber 132 through a suitable air lock to prevent loss of sterilizing gas and entry of air into chamber 132.

The particulate material is drawn into filter unit 144 through a conduit 184 that terminates in a wand 186 which can be thrust into a container 188 of the particulate material. The container 188 is preferably placed on an inclined support 190 which may be vibrated to expedite the entry of the particulate material into vacuum wand 186.

As the particulate material is drawn into filter 144 through conduit 186, it is separated from the airstream that carries it by the bags in filter 144, then drops down to the bottom of filter 144 and passes through the air lock therein into treatment chamber 132. The particulate material then drops to the bottom of chamber 132 and is fed into rotary feed device 140 where it is picked up and carried by a stream of compressed sterilizing gas originating from a blower 192 whose compression side is coupled via conduit 194 to rotary feed device 140 and whose suction side is coupled via conduit 196 to the top of filter unit 142. The particulate material picked up by the gas stream at rotary feed device 140 is conveyed through conduit 150, solenoid diverter valve 148, conduit 152, solenoid diverter valve 198, and conduit 200 back to the top of treatment chamber 132. There the particulate material is separated from the sterilizing gas stream by the porous bags in filter unit 142 and is held in suspension by the gas stream for a period of time, eventually falling to the bottom of chamber 132 to repeat the circuit. The particulate matter that falls upon the sloping sides of bottom portion 138 is flushed with sterilizing gas that enters through aerators 156, which prevent the particulate material from sticking to the sides of bottom portion 138, wholly or partially suspend the particulate material within chamber 132 and also help to sterilize the particulate material. The compressed gas for aerators 156 is derived from a blower 202 which is mounted in the same housing as blower 192. The compression side of blower 202 is coupled to conduit 160 and its suction side is coupled to filter unit 142 via conduit 196.

In the places where the sterilizing gas stream is directed upwardly, i.e. in filter unit 142 and chamber 132, the particulate material tends to be suspended in a fluid state while the sterilizing gas stream passes through the suspended material. This causes the sterilizing gas to be flushed around the individual particles of the particulate material to effect complete sterilization. The suspension of the particulate matter is caused by the combined action of the upward gas stream, the downward force of gravity on the particulate material, and the separating effect of the porous bags in filter unit 142, which separate the particulate material from the gas stream. Thus, the means for suspending the particulate material in a fluid state includes the means for generating an upward stream of mixed sterilizing gas and particulate material, and the separator for separating the particulate material from the gas stream. A dispersal cone such as disclosed in FIG. 7 may be employed within chamber 132 if desired to cause the suspended particulate material to spread out so that it will remain suspended for a greater length of time.

As the particulate material is repeatedly cycled through the treatment chamber 132, and is repeatedly separated from the sterilizing gas stream in filter unit 142, the porous bags of filter unit 142 may tend to become clogged with very fine particulate material. In the embodiment disclosed in FIGS. 1–4, this condition was avoided by mechanically shaking the bags. In this embodiment, periodically pulsed gas jets are preferably directed against the side of the filter bags within the filter unit 142 to remove particulate material from the bags. These pulsed gas jets are directed through conduits within filter unit 142 which are well known in the prior art and hence are not shown in the drawings. The compressed gas for the pulsed gas jets is derived from a blower 204 which is mounted in the same housing as blowers 192 and 202. The compression side of blower 204 is coupled to filter unit 142 through conduit 206 and the suction side of blower 204 is coupled to filter unit 142 through conduit 196.

As the particulate material and sterilizing gas are circulated through the treatment chamber 132, it is desirable for the temperature of the gas to be raised within the range of 130°F. to 150°F., and for the relative humidity of the gas to be raised to approximately 40%. As described in connection with the embodiment of FIG. 5, this can be done in a heater and humidifier such as unit 94 which may, for the sake of convenience, be located within the housing for blowers 192, 202 and 204.

After the sterilization process is completed, as determined by visual observation of a mold spore strip 208 mounted under a window 210 in the wall of chamber 132, the particulate material is transferred to an aeration chamber 212 to have the sterilizing gas removed therefrom by aeration in a stream of purified fresh air. Aeration chamber 212 has a cylindrical side wall 214, a flat top 216, and a downwardly sloping bottom portion 218 which terminates in a rotary feed device 220. The rotary feed device 220 may be the same as the rotary feed device 89 described above in connection with FIG. 5, and a maintenance slide gate or knife gate may be mounted above rotary feed device 220 to facilitate its removal for maintenance purposes.

A cyclonic separator 222 is mounted on top 216 of aeration chamber 212 and communicates into the chamber to introduce particulate material therein. The particulate material is carried tangentially into the top of cyclonic separator 222 through a conduit 224 which is coupled to diverter valve 198 to receive a mixed stream of gas and particulate material therefrom. This material flows through conduit 200 back to treatment chamber 132 when it is being treated, but at the end of the treatment period, the diverter valve 198 is switched to divert the material into cyclonic separator 222 through conduit 224. The sterilizing gas is separated from the particulate material in separator 222 in accordance with well known prior art centrifugal separator principles and the particulate material falls into aeration chamber 212. The sterilizing gas is returned or recycled to treatment chamber 132 via conduit 226, solenoid diverter valve 228, and conduit 230. The separation of the sterilization gas from the particulate material before it is aerated is important because this conserves the gas to be used again in the treatment chamber 132. Without such separation, the entire charge of gas would be wasted when the particulate material is aerated.

A filter unit 232 containing porous filter bags (not shown) is mounted on top 216 of aeration chamber 212 and communicates thereinto. The top of filter unit 232 is coupled to diverter valve 228 through conduit 234, through which the last of the sterilizing gas from cyclonic separator 222 can be diverted at the end of the charging cycle for aeration chamber 212. An exhaust duct 236 on the top of filter unit 232 exhausts to the atmosphere. The filter unit preferably includes pulsed gas jets as described above for cleaning the porous filter bags to prevent them from clogging up. The compressed air for these pulsed gas jets is provided by a blower 238 whose compression side is coupled to filter unit 232 through conduit 240 and whose suction side is vented to the atmosphere.

The compressed air for aeration chamber 212 is derived from blower 162 which, during the aeration cycle, is rotated in such direction as to apply compression to conduit 170 and suction to conduit 164. Sterilized and cooled fresh air is drawn into blower 162 from an ultra-violet sterilizer and cooler unit 242 through conduit 244, solenoid diverter valve 166, and conduit 164. This sterilized and cooled fresh air is blown through conduit 170, diverter valve 172, and conduit 246 to the rotary feed device 220, where it picks up particulate material that has fallen to the bottom of aeration chamber 220. The sterilized and cooled fresh air is also blown into aeration chamber 212 through conduit 248, manifold 250, and aerators 252, which serve the same purposes as the aerators 156 described previously.

In the aeration cycle, the particulate material which is picked up by the sterilized and cooled compressed air applied to rotary feed device 220 is returned to the top of aeration chamber 212 via conduit 254, diverter valve 256, conduit 258, diverter valve 260, and conduit 262. The particulate material is then separated from the air stream in filter unit 232, and the air is exhausted to the atmosphere through exhaust duct 236. The particulate material is suspended for a time in the air stream leading into filter unit 232 and then falls down to the bottom of the aeration chamber 212, where it is delivered by rotary feed device 220 back into the sterilized air stream to be carried therein back to the top of aeration chamber 212. The particulate material which falls upon the sloping sides of bottom portion 218 is additionally aerated by aerators 252. In this manner, the particulate material is repeatedly flushed or scrubbed with sterilized and cooled fresh air to remove all traces of the sterilizing gas that was used to sterilize the particulate material. At the same time, the particulate material is cooled back to room temperature.

When the sterilized particulate material is sufficiently aerated, as determined by monitoring the discharge from exhaust duct 236, the particulate material is diverted by valve 260 into an output conduit 264 which carries the particulate material to packaging means, not shown, where the material is packed into sealed containers to prevent recontamination. The aeration chamber 212 can then be cleaned by a water spray introduced through a water conduit 266 in top 216. The wash water is drained out the bottom of chamber 212 through conduit 254 and is flushed down a water drain conduit 268 by diverter valve 256.

In the above-described sterilization and aeration cycles, the solenoid valves which control the flow of gas and particulate material through the various conduits can be controlled manually by actuating corresponding electric switches, which are omitted from the drawings for purposes of clarity, but whicih are preferably wired to the solenoid valves to control the same in accordance with well known prior art practices. If desired, automatic control circuitry may be incorporated into the the above-noted apparatus to automatically control the operation of the solenoid valves, blowers, etc. It should be understood, however, that such automatic control circuitry is optional and furthermore that the apparatus for this invention may be controlled by mechanically actuated valves instead of solenoid valves if desired, although the solenoid valves have the advantage of permitting the control switches to be mounted on the same panel for centralized control.

We claim:

1. A method for sterilizing a particulate material comprising the steps of blowing said material via a gas stream into a collector for trapping a substantial portion of the particulate material therein, blowing a sterilizing gas medium through at least a portion of the trapped particulate material to at least partially suspend the particulate material in a fluid state in said sterilizing gas medium and flushing the sterilizing gas medium around the individual particles of said particulate material in the course of blowing said sterilizing gas medium through the suspended particulate material, and pneumatically recirculating sterilizing gas medium from the top of the collector to the bottom of the collector for repeated blowing through the suspended particulate material, plus the step of selectively pneumatically recirculating sterilizing gas medium containing particulate material from the bottom of the collector to the top of the collector for repeated flushing of the particulate material by the sterilizing gas medium and, after said particulate material has been sterilized, discharging the particulate material from the collector.

2. The method of claim 1 plus the step of continuously exposing a visual indicator to said sterilizing gas medium, which indicator visibly exhibits a physical change upon being subjected to a selected amount of sterilizing gas medium, and inspecting the indicator to determine when the sterilization process has been completed.

3. The method of claim 1 plus the step of selectively discontinuing blowing the sterilizing gas medium and at the end of the sterilizing process substituting pure air therefore in order to aerate the sterilized particulate material.

4. The method of claim 1 in which the collector comprises a plurality of porous bags, plus the step of shaking the bags when sterilization has been completed to dump the contents thereof into a storage receptacle.

5. The method of claim 1 in which the particulate material is blown into the collector at the top of the collector and the sterilizing gas medium is blown into the collector near the bottom thereof and flows upwardly to apply lifting force to the particulate material to suspend said particulate material in the sterilizing gas medium.

6. The method of claim 5 in which the gas stream by which the particulate material is blown into the top of the collector includes said sterilizing gas medium.

7. The method of claim 1 wherein the particulate material is pneumatically discharged into a separate chamber and further including the step of subsequently blowing pure air through said particulate material for aeration thereof.

8. The method of claim 7 plus the step of initially filling said separate chamber with said sterilizing gas medium before pneumatically transferring said sterilized particulate material thereinto.

9. The method of claim 8 in which the step of pneumatically transferring said sterilized particulate material into the separate chamber is accompanied by concurrent pneumatic recycling of sterilizing gas medium from said separate chamber back to the collector.

\* \* \* \* \*